Dec. 5, 1939.   C. A. CHAYNE   2,182,248
SPRING SUSPENSION
Filed July 6, 1937   3 Sheets-Sheet 1
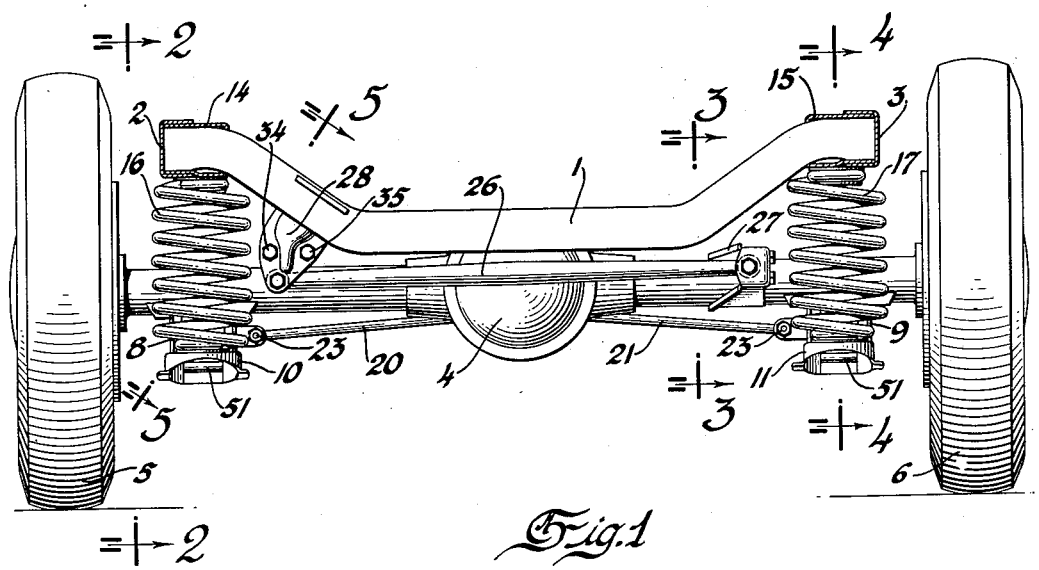
Fig.1
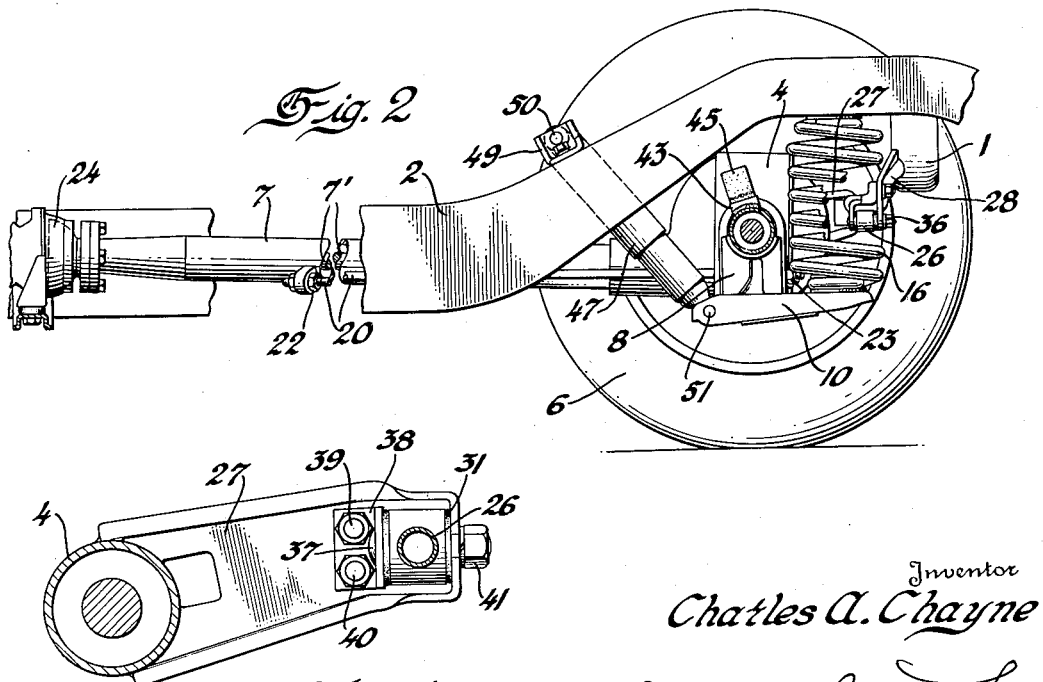
Fig. 2
Fig. 3
Inventor
Charles A. Chayne
By Blackmore, Spencer & Flint
Attorneys

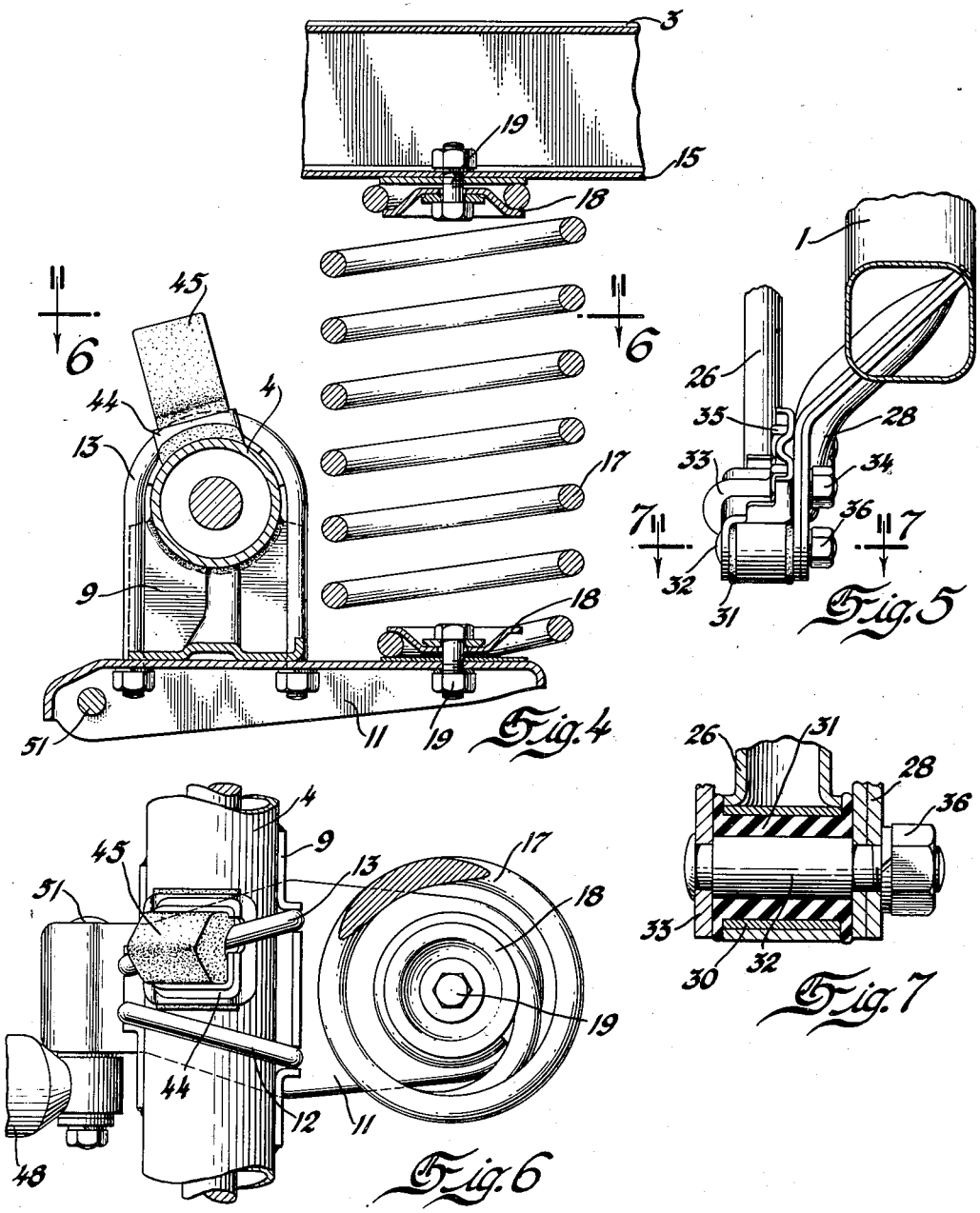

Dec. 5, 1939.  C. A. CHAYNE  2,182,248
SPRING SUSPENSION
Filed July 6, 1937  3 Sheets-Sheet 3
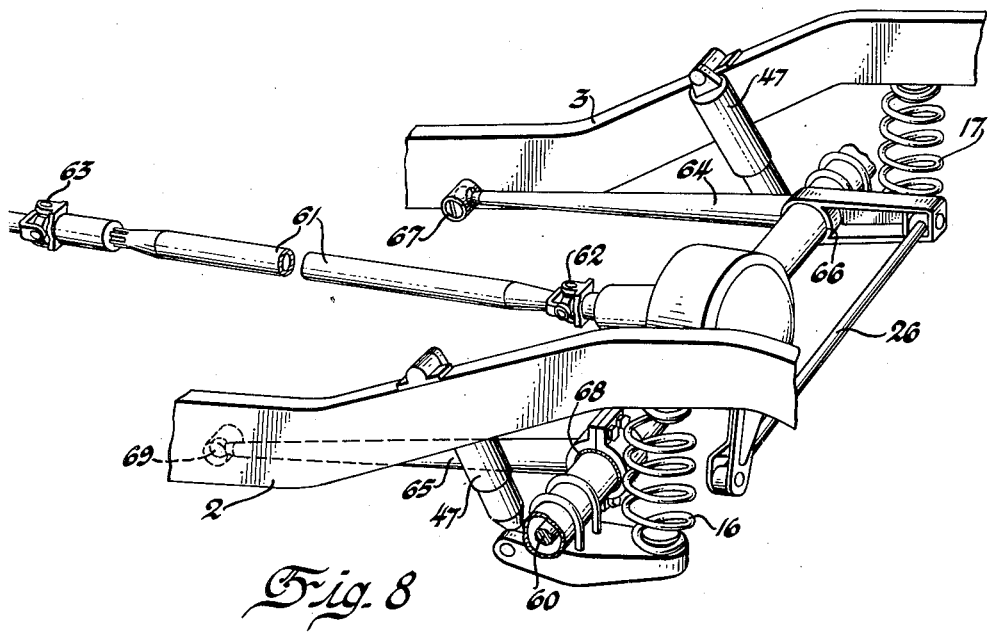
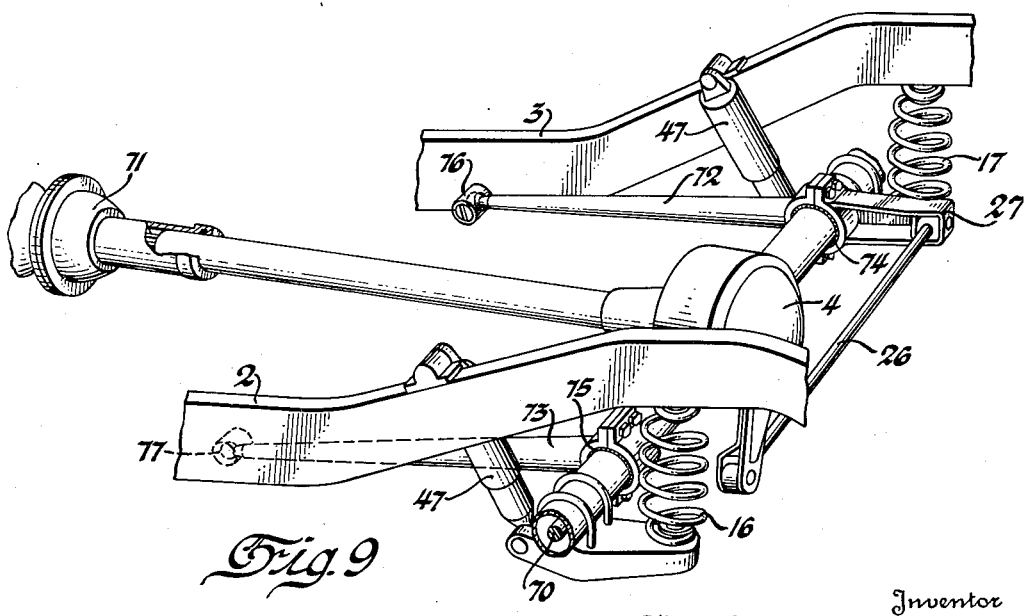
Inventor
Charles A. Chayne Patented Dec. 5, 1939

2,182,248

UNITED STATES PATENT OFFICE 2,182,248

SPRING SUSPENSION

Charles A. Chayne, Flint, Mich., assignor to General Motors Corporation, Detroit, Mich., a corporation of Delaware Application July 6, 1937, Serial No. 152,056

8 Claims. (Cl. 180—73)

This invention relates to resilient suspension means between the frame and the wheels of a vehicle.

It relates particularly to suspension means for a motor vehicle having a conventional axle carrying road wheels on opposite sides of the vehicle.

The object of the invention is a suspension system for a conventional axle, in which the resilient means is relieved of all functions other than the springing of the vehicle.

A more specific object of the invention is a suspension system, for a vehicle axle, in which movements of the axle relatively to the vehicle frame are controlled, longitudinally of the vehicle by a radius arm arranged longitudinally of the vehicle and suitably connected to the frame and the axle, transversely of the vehicle by a radius rod pivotally connected to both the axle and the vehicle frame, and upwardly relatively to the vehicle frame by coil spring means resiliently resisting upward movements of the axle relatively to the frame.

The above and other objects of the invention will be apparent as the description proceeds.

The drawings show the application of the invention to the rear driving axle of a motor vehicle.

In the drawings:

Fig. 1 is a rear view of a torque tube drive rear axle according to the invention, of the type in which both the driving thrust and the driving torque reaction of the road wheels are taken through a torque tube enclosing the propeller shaft.

Fig. 2 is a side elevation on line 2—2 of Fig. 1.

Fig. 3 is an enlarged view of a detail taken on line 3—3 of Fig. 1.

Fig. 4 is an enlarged view of some of the parts on line 4—4 of Fig. 1.

Fig. 5 is an enlarged view of some of the parts on line 5—5 of Fig. 1.

Fig. 6 is a view taken on line 6—6 of Fig. 4.

Fig. 7 is an enlarged view on line 7—7 of Fig. 5.

Fig. 8 is a somewhat diagrammatic perspective view of a modified form of the invention, as applied to a rear axle of the Hotchkiss type, the driving thrust of the road wheels being taken by suitably disposed radius arms of which one serves also to take the driving torque reaction of the road wheels.

Fig. 9 is a somewhat diagrammatic perspective view of another modification of the invention, as applied to a torque tube drive rear axle of the type in which the torque tube enclosing the propeller shaft has a ball slip joint connection with the vehicle frame, the driving thrust of the road wheels being taken by suitably disposed radius arms.

Referring now more particularly to Figs. 1 to 7.

The vehicle frame has a cross member 1 and side members 2 and 3. The rear axle housing 4 supports driven rear wheels 5 and 6, and its movement longitudinally of the frame is controlled by a radius arm 7 which actually is a torque tube through which the propeller shaft 7' carries the drive from the engine and transmission (not shown).

On the underside of the axle housing 4, and towards the ends thereof, are brackets 8 and 9 for spring seats 10 and 11 which extend rearwardly and are each fastened to the axle housing, by two U-shaped clips 12 and 13.

Between each of the spring seats 10 and 11 and reinforcing members 14 and 15 for the frame side members 2 and 3, are coil springs 16 and 17, respectively. The springs 16 and 17 have parallel end coils of smaller diameter than the active helical coils of the spring, and are secured to the vehicle frame and the seats 10 and 11 between cupped clamps such as 18, by bolts 19.

Strut rods 20 and 21 extend from the torque tube 7 to the brackets 8 and 9. Their ends are screw threaded and they are secured to the torque tube and the brackets by nuts 22 and 23, respectively. The torque tube 7, with its strut rods 20 and 21, is pivotally connected to the vehicle frame, through a ball joint 24, in the usual and well known manner, and takes both the driving torque reaction and the driving thrust of the road wheels.

A transverse tubular radius rod 26 has one end pivotally connected to a bracket 27 on the axle housing 4, towards the right hand side of the vehicle, and its other end pivotally connected to a bracket 28 on the frame cross member 1, towards the left hand side of the vehicle. The radius rod 26 has identical eyes at each end, provided by sleeves such as 30 (Fig. 7) which are brazed or otherwise suitably secured in the rod. Rubber bushings 31 are interposed between the sleeves 30 and pivot pins for the ends of the radius rod 26.

Referring now particularly to Figs. 5 and 7, which show the manner in which the radius rod is connected to the bracket 28, one end of the pivot pin 32 is riveted to a bracket 33, which is bolted to the bracket 28 by bolts 34 and 35. The other end of the pivot pin is screw threaded and passes through a hole in the bracket 28. When the nut 36 on the pivot pin, and the bolts 34 and 35 are tightened, the rubber bushing 31 is compressed and frictionally grips both the pin 32 and the sleeve 30.

The other end of the radius rod 26 is connected to the bracket 27 in a similar manner. As shown in Fig. 3, one end of the pivot pin 37 is riveted to a bracket 38, which is bolted to the bracket 27 by bolts 39 and 40. The other end of the pivot pin 37 is screw threaded and passes through a hole in the bracket 27. When the nut 41 on the pivot pin 37 is tightened, the rubber bushing 31 is compressed and frictionally grips both the pin 37 and the sleeve 30 of that end of the radius rod.

The pivot pins 32 and 37 are substantially horizontal and parallel to each other longitudinally of the vehicle, in the normal position of the parts. Pivotal movement of the radius rod 26 about the axes of the pivot pins 32 and 37 and also a degree of universal movement is permitted by the flexibility of the rubber bushings 31, in known manner.

On the upper side of the axle housing 4, above the brackets 8 and 9 and embraced by the clips 13 are brackets 43 and 44 for rubber bumpers 45, as shown in Figs. 2, 4 and 6. The rubber bumpers 45 coact with the frame side members 2 and 3, resiliently to resist and cushion extreme upward deflections of the axle 4 relatively to the vehicle frame.

A pair of direct acting hydraulic shock absorbers 47 and 48, of well known type, are operative between the axle housing 4 and the vehicle frame. The shock absorber 47 has one end pivotally connected to a bracket 49 on the frame side member 2, and its other end is pivotally connected to the spring seat 10. The shock absorber 48 is similarly connected between the frame side member 3 and the spring seat 11. The pivotal connections for the shock absorbers provide for a degree of universal movement as well as pivotal movement and preferably include pivot pins 50 and 51, riveted, respectively, to the brackets such as 49 on the frame side members 2 and 3, and to the spring seats 10 and 11. The pivot pins 50 and 51 are substantially horizontal and parallel to each other transversely of the vehicle, in the normal position of the parts, and are provided with rubber bushings similar to those used for the radius rod 26, and shown in Fig. 7.

It will be appreciated that the resilient rubber bushings, for the pivot axes of the radius rod 26 and the shock absorbers 47 and 48, permit the requisite small degree of universal movement as well as pivotal movement of these parts, in order that they may be self accommodating to the prescribed movement of the axle, about pivot axes in different nonparallel planes. They also provide a certain amount of insulation against the transmission of noise.

As arranged, the direct acting shock absorbers 47 and 48 function also, to some extent, as telescopic guides, tending to restrict the axle to simple movement in an arc of a circle about a normally horizontal transverse axis at the pivot point of the torque arm on the frame.

In the embodiment of the invention shown in Fig. 8, the rear axle 60 is of the Hotchkiss type, with a propeller shaft 61 having universal joints 62 and 63 at its ends. Two radius arms 64 and 65, arranged longitudinally of the vehicle, are provided to control movement of the axle longitudinally of the frame. The radius arm 64 is rigidly attached to the axle towards one end thereof at 66, and is pivotally connected to the frame through a ball joint 67, to take the driving torque reaction as well as the driving thrust of the road wheels. The radius arm 65 is pivotally connected to the other end of the axle through a bearing 68 embracing the axle, and is pivotally connected to the frame through a ball joint 69.

In Fig. 9 the rear axle 70 is of the torque tube type, having a ball slip joint connection 71 with the vehicle frame, so that it is capable only of taking the driving torque reaction of the wheels. Two radius arms 72 and 73 arranged longitudinally of the vehicle are provided to control movement of the axle longitudinally of the frame. The radius arms 72 and 73 are pivotally connected respectively to opposite ends of the axle 70 through bearings 74 and 75 embracing the axle and are pivotally connected to the frame through ball joints 76 and 77.

The bearing 68 of Fig. 8, and the bearings 74 and 75 of Fig. 9, are self aligning to a degree sufficient to prevent binding which would otherwise result from the action of the transverse radius rod. The self aligning feature may be provided by the use of suitable rubber bushings.

The remaining elements of Figs. 8 and 9 are substantially like those described in conjunction with Figs. 1 to 7. In Fig. 9 the bracket 27' through which the transverse radius rod 26 is connected to the axle, is attached to the bearing of radius arm 72. It will, however, be appreciated that the bracket 27' may be rigidly attached to the axle as shown in the remaining embodiment of the invention.

While the invention has been shown as applied to a rear driving axle, it will be apparent that it is equally applicable to a front axle for dirigible wheels, or any other axle connected to the vehicle frame by a radius arm connection which is capable of a degree of universal movement, as well as pivotal movement in a longitudinal vertical plane of the vehicle.

Furthermore, while in the application of the invention to a rear axle, as illustrated, the coil springs are to the rear of the rear axle, and would be correspondingly forward of a front axle, they may be otherwise disposed in any suitable position between the vehicle frame and the axle (e. g. forwardly of a rear axle or rearwardly of a front axle, or on top of the axle).

I claim:

1. In a motor vehicle, in combination, a frame; an axle carrying road wheels on opposite sides of the vehicle; a radius arm controlling movement of the axle longitudinally of the frame; a radius rod arranged transversely of the vehicle to control movement of the axle transversely of the frame; spring seats rigidly attached to the axle; spring means resiliently resisting upward movement of the axle relatively to the frame, said spring seats having extensions forwardly and rearwardly of the axle, and said spring means seating on the extensions on one side of the axle only; and a pair of shock absorbers connected respectively to the other extension of each spring seat and operative between the axle and the vehicle frame.

2. The combination according to claim 1, in which the axle is a rear axle, the spring means are a pair of coil springs seating on the rearward extensions of their respective spring seats, and the shock absorbers are direct acting shock absorbers pivotally connected to the forward extensions of the spring seats and to the vehicle frame at points forward of the rear axle.

3. The combination according to claim 1, in which the radius arm is arranged towards one side of the vehicle, being rigidly attached to the axle towards one end thereof, and pivotally connected to the frame, and a radius arm is provided between the other end of the axle and the vehicle frame; said last named radius arm being arranged longitudinally of the vehicle, and being pivotally connected to the axle and the frame.

4. In a motor vehicle, in combination, a frame; a torque tube drive rear axle, a radius rod arranged transversely of the vehicle to control movement of the axle transversely of the frame; spring seats rigidly attached to the axle; coil spring means resiliently resisting upward movement of the axle relatively to the frame, said spring seats having extensions forwardly and rearwardly of the axle, and said coil springs seating on the extensions on one side of the axle only; and a pair of shock absorbers connected respectively to the other extension of each spring seat and operative between the axle and the vehicle frame.

5. In a motor vehicle in combination, a frame; a rear axle carrying road wheels on opposite sides of the vehicle; a radius arm arranged longitudinally of the vehicle and suitably connected to the frame and the axle to control movement of the axle longitudinally of the frame; a radius rod arranged transversely of the vehicle, to control movement of the axle transversely of the frame, said radius rod having one end pivotally connected to the vehicle frame towards one side of the vehicle and its other end pivotally connected to the axle towards the other side of the vehicle; coil spring means between the axle and the vehicle frame, resiliently resisting upward movement of the axle relatively to the frame, and a pair of direct acting shock absorbers between the rear axle and the vehicle frame; said shock absorbers being pivotally connected respectively to the frame side members at points forward of the rear axle, and to spring seats rigidly attached to the underside of the axle towards opposite ends thereof, said spring seats extending forwardly and rearwardly of the rear axle, the shock absorbers being connected to the forward extension and the coil springs being attached to the rearward extension of the spring seats.

6. In a motor vehicle, in combination, a frame, a driving axle; a radius arm arranged longitudinally of the vehicle, said radius arm being rigidly attached to the axle towards one end thereof, and pivotally connected to the frame to take the driving torque reaction as well as the driving thrust of the road wheels; a second radius arm arranged longitudinally of the vehicle, said second radius arm being pivotally connected to the other end of the axle and the frame; a radius rod arranged transversely of the vehicle to control movement of the axle transversely of the frame, said radius rod having one end pivotally connected to the vehicle frame towards one side of the vehicle and its other end pivotally connected to the axle towards the other side of the vehicle; and coil spring means between the axle and the vehicle frame, resiliently resisting upward movements of the axle relatively to the frame.

7. In a motor vehicle, in combination, a frame; a Hotchkiss type rear axle; a radius arm arranged longitudinally of the vehicle, said radius arm being rigidly attached to the axle towards one end thereof, and pivotally connected to the frame to take the driving torque reaction as well as the driving thrust of the road wheels; a second radius arm arranged longitudinally of the vehicle, said second radius arm being pivotally connected to the other end of the axle and the frame; a radius rod arranged transversely of the vehicle to control movement of the axle transversely of the frame, said radius rod having one end pivotally connected to the vehicle frame towards one side of the vehicle and its other end pivotally connected to the axle towards the other side of the vehicle; and coil spring means between the axle and the vehicle frame, resiliently resisting upward movements of the axle relatively to the frame.

8. In a motor vehicle, in combination, a frame; a torque tube drive rear axle, said torque tube having a ball slip joint connection with the frame; radius arms between each end of the axle and the frame to control movement of the axle longitudinally of the frame, said radius arms being arranged longitudinally of the vehicle and being pivotally connected to the axle and the frame; a radius rod arranged transversely of the vehicle to control movement of the axle transversely of the frame, said radius rod having one end pivotally connected to the vehicle frame towards one side of the vehicle and its other end pivotally connected to the axle towards the other side of the vehicle; and coil spring means between the axle and the vehicle frame, resiliently resisting upward movements of the axle relatively to the frame.

CHARLES A. CHAYNE.